United States Patent
Prasad et al.

(10) Patent No.: US 9,161,056 B2
(45) Date of Patent: Oct. 13, 2015

(54) METHOD FOR LOW MEMORY FOOTPRINT COMPRESSED VIDEO DECODING

(75) Inventors: Keshava Prasad, Bangalore (IN); Pavan Shastry, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 524 days.

(21) Appl. No.: 13/303,475

(22) Filed: Nov. 23, 2011

(65) Prior Publication Data

US 2012/0201308 A1    Aug. 9, 2012

Related U.S. Application Data

(60) Provisional application No. 61/416,802, filed on Nov. 24, 2010.

(51) Int. Cl.
*H04N 7/26* (2006.01)
*H04N 19/573* (2014.01)
*H04N 19/61* (2014.01)
*H04N 19/132* (2014.01)
*H04N 19/44* (2014.01)

(52) U.S. Cl.
CPC ........... *H04N 19/573* (2014.11); *H04N 19/132* (2014.11); *H04N 19/44* (2014.11); *H04N 19/61* (2014.11)

(58) Field of Classification Search
CPC ............ H04N 19/00715; H04N 19/61; H04N 19/573; H04N 19/44; H04N 19/132
USPC ........................... 375/240; 386/112; 382/233
See application file for complete search history.

(56) References Cited

U.S. PATENT DOCUMENTS

| | | | |
|---|---|---|---|
| 6,633,609 B1 * | 10/2003 | Ing et al. | 375/240.03 |
| 2004/0005004 A1 * | 1/2004 | Demos | 375/240.08 |
| 2006/0171685 A1 * | 8/2006 | Chen et al. | 386/112 |
| 2006/0227880 A1 * | 10/2006 | Gordon et al. | 375/240.25 |

* cited by examiner

*Primary Examiner* — Dave Czekaj
*Assistant Examiner* — Berteau Joisil
(74) *Attorney, Agent, or Firm* — Robert D. Marshall, Jr.; Frank D. Cimino

(57) ABSTRACT

This invention is a method of memory saving in compressed video decoding. For each group of pictures the method determines whether less than the maximum number N reference frames are needed for decoding. If so, then a memory is configuring for the needed number M reference frames less than N. If not, the memory is configured for N reference frames. The group of pictures is decoding the group of pictures using the configured number of reference frames.

6 Claims, 5 Drawing Sheets

(1) L1I CACHE MISS FILL FROM L2
(2) L1D CACHE MISS FILL FROM L2
(3) L1D WRITE MISS TO L2, OR L1D VICTIM TO L2, OR L1D SNOOP RESPONSE TO L2
(4) L2 CACHE MISS FILL, OR DMA INTO L2
(5) L2 VICTIM WRITE BACK, OR DMA OUT OF L2
(6) DMA INTO L2
(7) DMA OUT OF L2

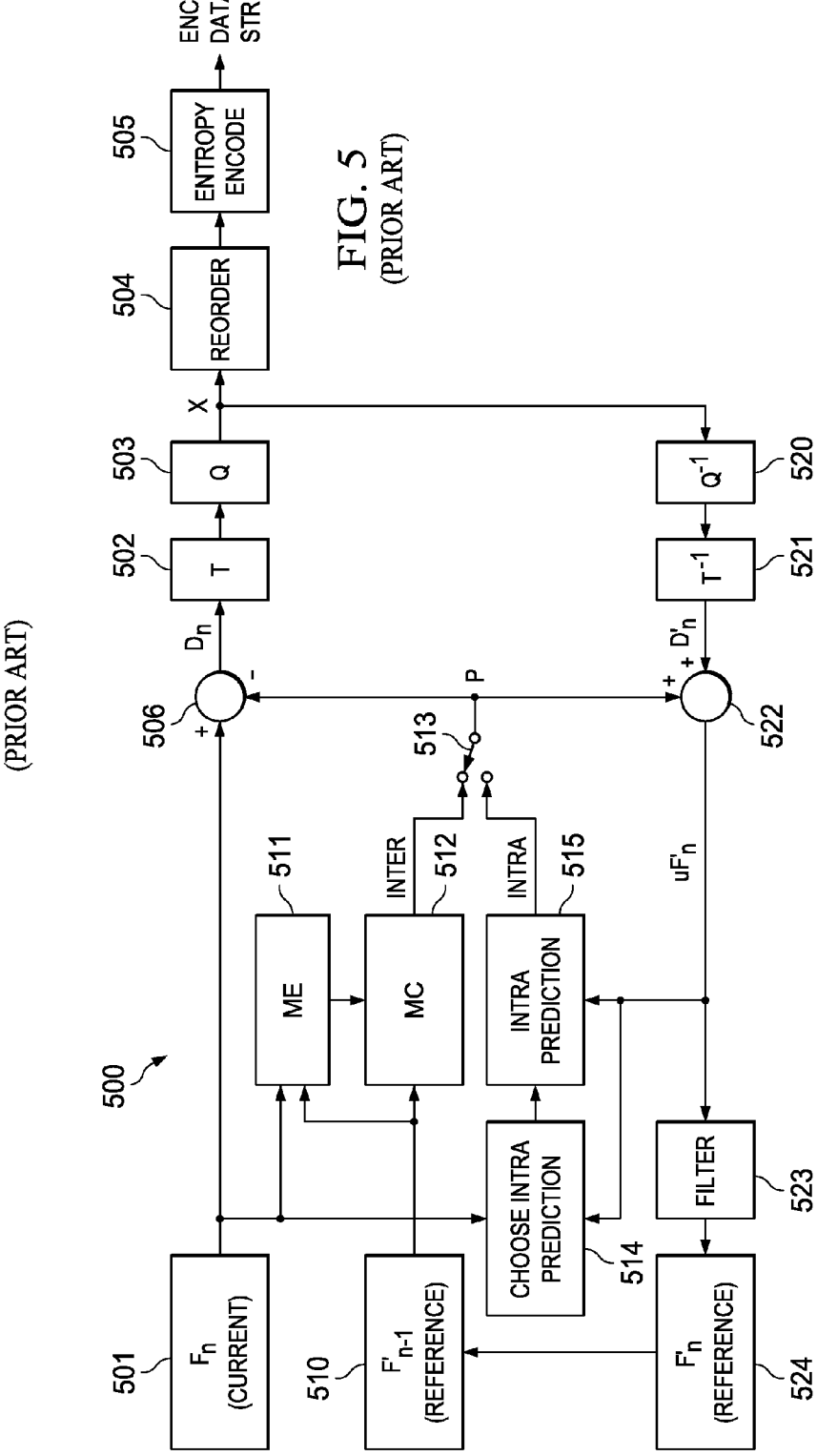

US 9,161,056 B2

METHOD FOR LOW MEMORY FOOTPRINT COMPRESSED VIDEO DECODING

CLAIM OF PRIORITY

This application claims priority under 35 U.S.C. 119(e)(1) to U.S. Provisional Application No. 61/416,802 filed Nov. 24, 2010.

TECHNICAL FIELD OF THE INVENTION

The technical field of this invention is video decoding.

BACKGROUND OF THE INVENTION

A typical H.264 universal decoder implementation needs a high dual data rate (DDR) memory footprint. This is primarily due to the large amount of memory needed for storing reference frames and co-located macroblock information required for decoding bidirectionally predicted (B) frame macroblocks. This is a big problem especially for High Definition (HD) decoding due to the large frame size.

A H.264 decoder typically requires multiple frames to be stored in a decoded picture buffer (DPB) as reference frames. The decoder may require up to N frames depending on the resolution. In addition many frames worth of macroblock information have to be stored in the DDR memory. These are co-located macroblock information needed to decode B macroblocks. This macroblock information typically needs to store 208 bytes for each macroblock.

According to the H.264 standard, five current decoded frames are need as reference frames for HD of 1920 pixels by 1080 pixels. The amount of memory needed for padded reference buffers and co-located macroblock information buffers is (4+1)*[((1920+64)*(1088+96)*1.5)+(8160*208)] or 24.9 Mbytes. Differing numbers of frame buffers is applicable for other pixel size resolutions. For example, for D1 resolution (720 pixels by 480 pixels) the maximum number of frame buffers is six. For CIF resolution (352 pixels by 288 pixels) the maximum number of frame buffers is 16.

This is a huge amount of memory. Many systems will not have this much free memory. This problem also becomes more severe in multichannel systems, where this large amount of memory needs to be allocated for each channel. This will demand a huge amount of DDR. Typical H264 decoder implementations need this memory regardless of the application or the type of streams/group of pictures (GOP) structures used.

SUMMARY OF THE INVENTION

This invention is a method of memory saving in compressed video decoding. For each group of pictures the method determines whether less than the maximum number N reference frames are needed for decoding. If so, then a memory is configuring for the needed number M reference frames less than N. If not, the memory is configured for N reference frames. The group of pictures is decoding the group of pictures using the configured number of reference frames.

This invention exploits situations where a current group of pictures requires less than the maximum number of frame buffers for decoding. This could occur due to the mix of frame types (I, P and B) in that group of pictures. The memory is configured for the number of frame buffers needed for that group of pictures. This avoids configuring more memory than needed in those cases not needing the maximum amount of memory.

BRIEF DESCRIPTION OF THE DRAWINGS

These and other aspects of this invention are illustrated in the drawings, in which:

FIG. 4 illustrates the instruction syntax of the very long instruction word digital signal processor core illustrated in FIG. 2 (prior art);

FIG. 5 illustrates an overview of the video encoding process of the prior art;

DETAILED DESCRIPTION OF PREFERRED EMBODIMENTS

Figure 1:
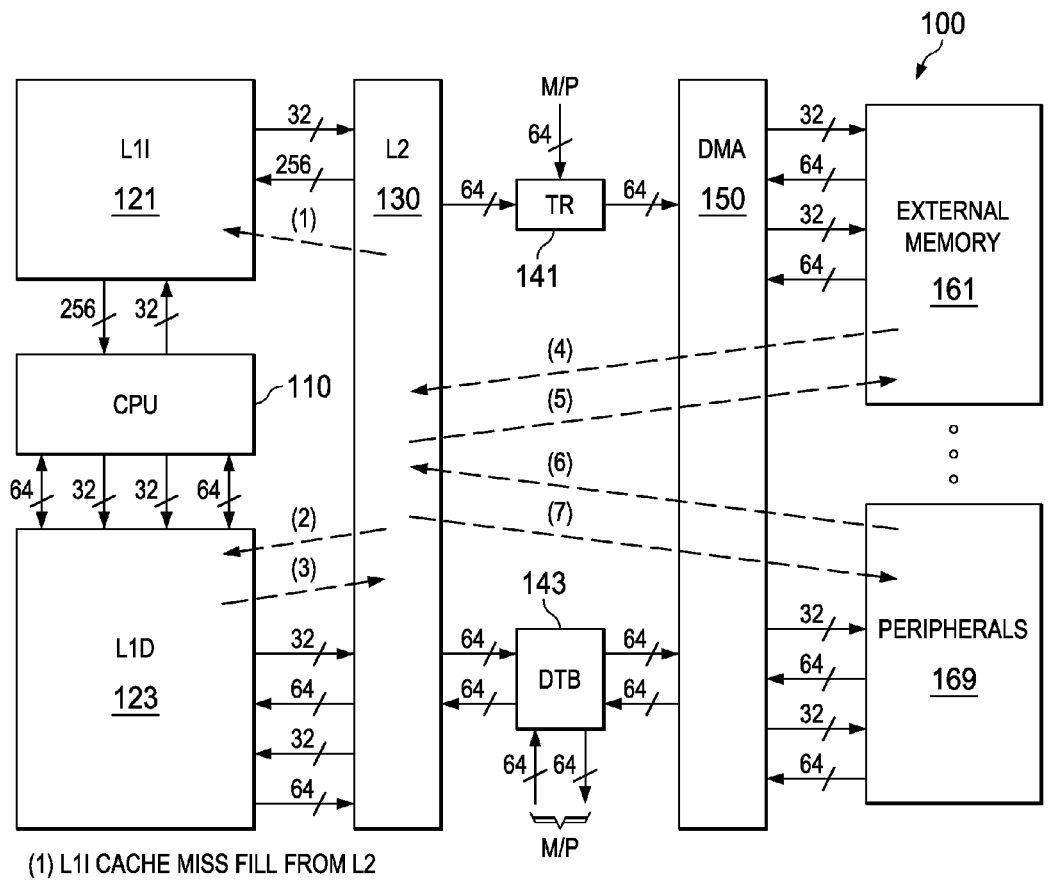
FIG. 1 illustrates the organization of a typical digital signal processor to which this invention is applicable (prior art)

FIG. 1 illustrates the organization of a typical digital signal processor system 100 to which this invention is applicable (prior art). Those skilled in the art would realize that this is an example only and that this invention can be practiced on a varied of programmable digital data processors having different organization than shown in FIGS. 1 to 4. Digital signal processor system 100 includes central processing unit core 110. Central processing unit core 110 includes the data processing portion of digital signal processor system 100. Central processing unit core 110 could be constructed as known in the art and would typically includes a register file, an integer arithmetic logic unit, an integer multiplier and program flow control units. An example of an appropriate central processing unit core is described below in conjunction with FIGS. 2 to 4.

Digital signal processor system 100 includes a number of cache memories. FIG. 1 illustrates a pair of first level caches. Level one instruction cache (L1I) 121 stores instructions used by central processing unit core 110. Central processing unit core 110 first attempts to access any instruction from level one instruction cache 121. Level one data cache (L1D) 123 stores data used by central processing unit core 110. Central processing unit core 110 first attempts to access any required data from level one data cache 123. The two level one caches are backed by a level two unified cache (L2) 130. In the event of a cache miss to level one instruction cache 121 or to level one data cache 123, the requested instruction or data is sought from level two unified cache 130. If the requested instruction or data is stored in level two unified cache 130, then it is supplied to the requesting level one cache for supply to central processing unit core 110. As is known in the art, the requested instruction or data may be simultaneously supplied to both the requesting cache and central processing unit core 110 to speed use.

Level two unified cache 130 is further coupled to higher level memory systems. Digital signal processor system 100 may be a part of a multiprocessor system. The other processors of the multiprocessor system are coupled to level two unified cache 130 via a transfer request bus 141 and a data transfer bus 143. A direct memory access unit 150 provides the connection of digital signal processor system 100 to external memory 161 and external peripherals 169.

Figure 2:
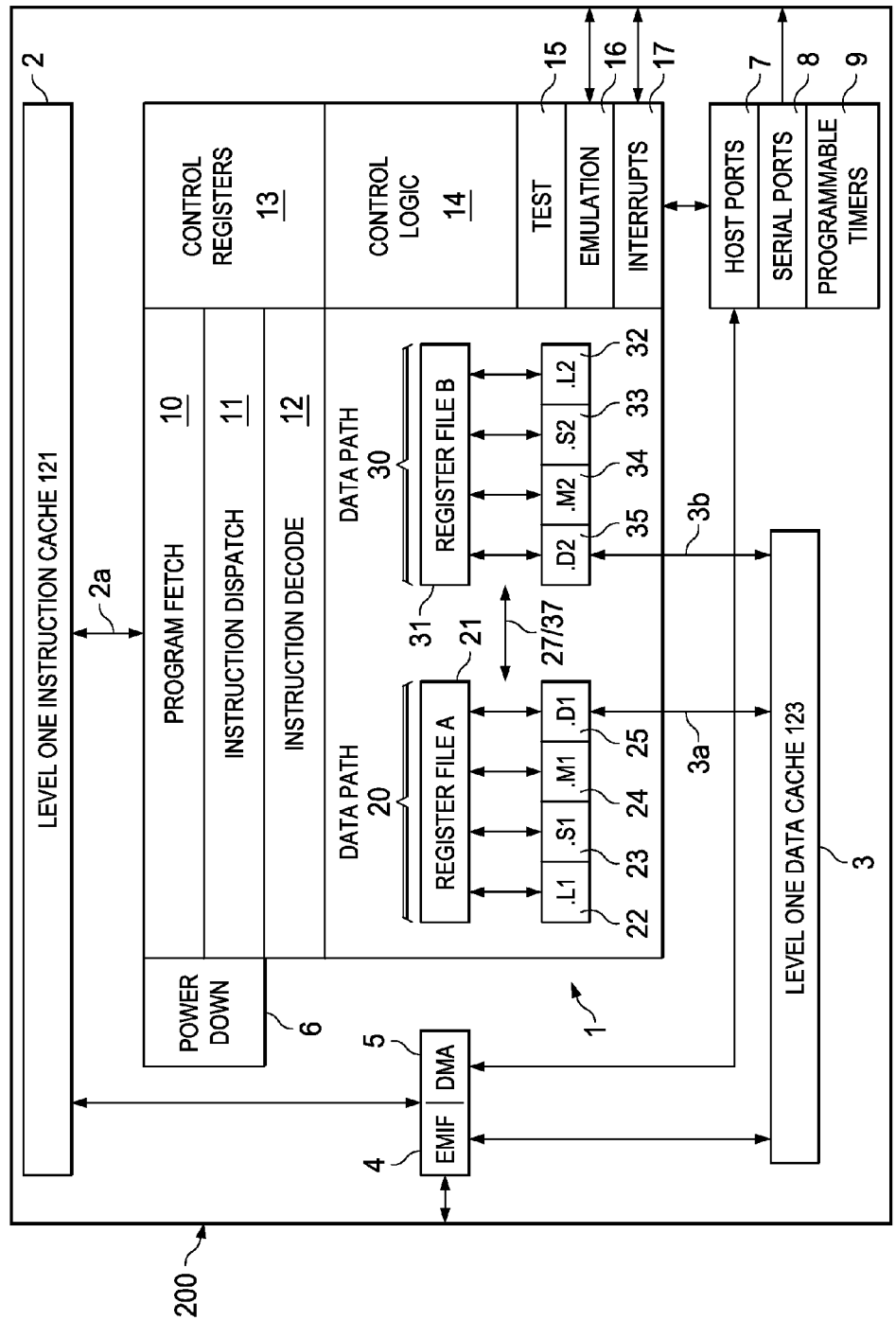
FIG. 2 illustrates details of a very long instruction word digital signal processor core suitable for use in FIG. 1 (prior art)

FIG. 2 is a block diagram illustrating details of a digital signal processor integrated circuit 200 suitable but not essential for use in this invention (prior art). The digital signal processor integrated circuit 200 includes central processing unit 1, which is a 32-bit eight-way VLIW pipelined processor. Central processing unit 1 is coupled to level 1 instruction cache 121 included in digital signal processor integrated circuit 200. Digital signal processor integrated circuit 200 also includes level one data cache 123. Digital signal processor integrated circuit 200 also includes peripherals 4 to 9. These peripherals preferably include an external memory interface (EMIF) 4 and a direct memory access (DMA) controller 5. External memory interface (EMIF) 4 preferably supports access to supports synchronous and asynchronous SRAM and synchronous DRAM. Direct memory access (DMA) controller 5 preferably provides 2-channel auto-boot loading direct memory access. These peripherals include power-down logic 6. Power-down logic 6 preferably can halt central processing unit activity, peripheral activity, and phase lock loop (PLL) clock synchronization activity to reduce power consumption. These peripherals also include host ports 7, serial ports 8 and programmable timers 9.

Central processing unit 1 has a 32-bit, byte addressable address space. Internal memory on the same integrated circuit is preferably organized in a data space including level one data cache 123 and a program space including level one instruction cache 121. When off-chip memory is used, preferably these two spaces are unified into a single memory space via the external memory interface (EMIF) 4.

Level one data cache 123 may be internally accessed by central processing unit 1 via two internal ports 3a and 3b. Each internal port 3a and 3b preferably has 32 bits of data and a 32-bit byte address reach. Level one instruction cache 121 may be internally accessed by central processing unit 1 via a single port 2a. Port 2a of level one instruction cache 121 preferably has an instruction-fetch width of 256 bits and a 30-bit word (four bytes) address, equivalent to a 32-bit byte address.

Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 and D1 unit 25 and 16 32-bit A registers forming register file 21. Second data path 30 likewise includes four functional units designated L2 unit 32, S2 unit 33, M2 unit 34 and D2 unit 35 and 16 32-bit B registers forming register file 31. The functional units of each data path access the corresponding register file for their operands. There are two cross paths 27 and 37 permitting access to one register in the opposite register file each pipeline stage. Central processing unit 1 includes control registers 13, control logic 14, and test logic 15, emulation logic 16 and interrupt logic 17.

Program fetch unit 10, instruction dispatch unit 11 and instruction decode unit 12 recall instructions from level one instruction cache 121 and deliver up to eight 32-bit instructions to the functional units every instruction cycle. Processing occurs in each of the two data paths 20 and 30. As previously described above each data path has four corresponding functional units (L, S, M and D) and a corresponding register file containing 16 32-bit registers. Each functional unit is controlled by a 32-bit instruction. The data paths are further described below. A control register file 13 provides the means to configure and control various processor operations.

Figure 3:
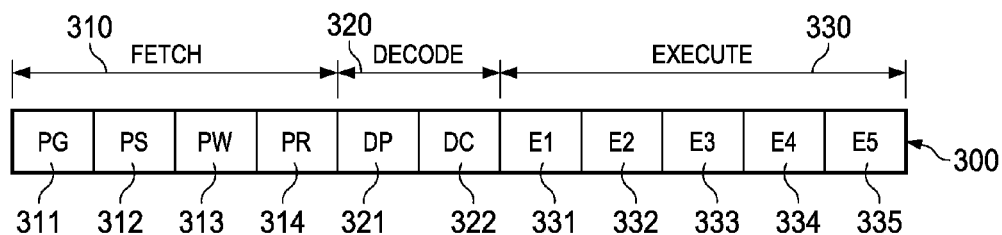
FIG. 3 illustrates the pipeline stages of the very long instruction word digital signal processor core illustrated in FIG. 2 (prior art)

FIG. 3 illustrates the pipeline stages 300 of digital signal processor core 110 (prior art). These pipeline stages are divided into three groups: fetch group 310; decode group 320; and execute group 330. All instructions in the instruction set flow through the fetch, decode, and execute stages of the pipeline. Fetch group 310 has four phases for all instructions, and decode group 320 has two phases for all instructions. Execute group 330 requires a varying number of phases depending on the type of instruction.

The fetch phases of the fetch group 310 are: Program address generate phase 311 (PG); Program address send phase 312 (PS); Program access ready wait stage 313 (PW); and Program fetch packet receive stage 314 (PR). Digital signal processor core 110 uses a fetch packet (FP) of eight instructions. All eight of the instructions proceed through fetch group 310 together. During PG phase 311, the program address is generated in program fetch unit 10. During PS phase 312, this program address is sent to memory. During PW phase 313, the memory read occurs. Finally during PR phase 314, the fetch packet is received at CPU 1.

The decode phases of decode group 320 are: Instruction dispatch (DP) 321; and Instruction decode (DC) 322. During the DP phase 321, the fetch packets are split into execute packets. Execute packets consist of one or more instructions which are coded to execute in parallel. During DP phase 322, the instructions in an execute packet are assigned to the appropriate functional units. Also during DC phase 322, the source registers, destination registers and associated paths are decoded for the execution of the instructions in the respective functional units.

The execute phases of the execute group 330 are: Execute 1 (E1) 331; Execute 2 (E2) 332; Execute 3 (E3) 333; Execute 4 (E4) 334; and Execute 5 (E5) 335. Different types of instructions require different numbers of these phases to complete. These phases of the pipeline play an important role in understanding the device state at CPU cycle boundaries.

During E1 phase 331, the conditions for the instructions are evaluated and operands are read for all instruction types. For load and store instructions, address generation is performed and address modifications are written to a register file. For branch instructions, branch fetch packet in PG phase 311 is affected. For all single-cycle instructions, the results are written to a register file. All single-cycle instructions complete during the E1 phase 331.

During the E2 phase 332, for load instructions, the address is sent to memory. For store instructions, the address and data are sent to memory. Single-cycle instructions that saturate results set the SAT bit in the control status register (CSR) if saturation occurs. For single cycle 16×16 multiply instructions, the results are written to a register file. For M unit non-multiply instructions, the results are written to a register file. All ordinary multiply unit instructions complete during E2 phase 322.

During E3 phase 333, data memory accesses are performed. Any multiply instruction that saturates results sets the SAT bit in the control status register (CSR) if saturation occurs. Store instructions complete during the E3 phase 333.

During E4 phase 334, for load instructions, data is brought to the CPU boundary. For multiply extensions instructions, the results are written to a register file. Multiply extension instructions complete during the E4 phase 334.

During E5 phase 335, load instructions write data into a register. Load instructions complete during the E5 phase 335.

FIG. 4 illustrates an example of the instruction coding of instructions used by digital signal processor core 110 (prior art). Each instruction consists of 32 bits and controls the operation of one of the eight functional units. The bit fields are defined as follows. The creg field (bits 29 to 31) is the conditional register field. These bits identify whether the instruction is conditional and identify the predicate register. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field is encoded in the instruction opcode as shown in Table 1.

TABLE 1

| Conditional | creg | | | z |
|---|---|---|---|---|
| Register | 31 | 30 | 29 | 28 |
| Unconditional | 0 | 0 | 0 | 0 |
| Reserved | 0 | 0 | 0 | 1 |
| B0 | 0 | 0 | 1 | z |
| B1 | 0 | 1 | 0 | z |
| B2 | 0 | 1 | 1 | z |
| A1 | 1 | 0 | 0 | z |
| A2 | 1 | 0 | 1 | z |
| A0 | 1 | 1 | 0 | z |
| Reserved | 1 | 1 | 1 | x |

Note that "z" in the z bit column refers to the zero/not zero comparison selection noted above and "x" is a don't care state. This coding can only specify a subset of the 32 registers in each register file as predicate registers. This selection was made to preserve bits in the instruction coding.

The dst field (bits 23 to 27) specifies one of the 32 registers in the corresponding register file as the destination of the instruction results.

The scr2 field (bits 18 to 22) specifies one of the 32 registers in the corresponding register file as the second source operand.

The scr1/cst field (bits 13 to 17) has several meanings depending on the instruction opcode field (bits 3 to 12). The first meaning specifies one of the 32 registers of the corresponding register file as the first operand. The second meaning is a 5-bit immediate constant. Depending on the instruction type, this is treated as an unsigned integer and zero extended to 32 bits or is treated as a signed integer and sign extended to 32 bits. Lastly, this field can specify one of the 32 registers in the opposite register file if the instruction invokes one of the register file cross paths 27 or 37.

The opcode field (bits 3 to 12) specifies the type of instruction and designates appropriate instruction options. A detailed explanation of this field is beyond the scope of this invention except for the instruction options detailed below.

The s bit (bit 1) designates the data path 20 or 30. If s=0, then data path 20 is selected. This limits the functional unit to L1 unit 22, S1 unit 23, M1 unit 24 and D1 unit 25 and the corresponding register file A 21. Similarly, s=1 selects data path 20 limiting the functional unit to L2 unit 32, S2 unit 33, M2 unit 34 and D2 unit 35 and the corresponding register file B 31.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

FIG. 5 illustrates the encoding process 500 of video encoding according to the prior art. Many video encoding standards use similar processes such as represented in FIG. 5. Encoding process 500 begins with the n th frame $F_n$ 501. Frequency transform block 502 transforms a macroblock of the pixel data into the spatial frequency domain. This typically involves a discrete cosine transform (DCT). This frequency domain data is quantized in quantization block 503. This quantization typically takes into account the range of data values for the current macroblock. Thus differing macroblocks may have differing quantizations. In accordance with the H.264 standard, in the base profile the macroblock data may be arbitrarily reordered via reorder block 504. As will be explained below, this reordering is reversed upon decoding. Other video encoding standards and the H.264 main profile transmit data for the macroblocks in strict raster scan order. The quantized data is encoded by entropy encoding block 505. Entropy encoding employs fewer bits to encode more frequently used symbols and more bits to encode less frequency used symbols. This process reduces the amount of encoded that must be transmitted and/or stored. The resulting entropy encoded data is the encoded data stream. This invention concerns content based adaptive arithmetic coding (CABAC) which will be further described below.

Video encoding standards typically permit two types of predictions. In inter-frame prediction, data is compared with data from the corresponding location of another frame. In intra-frame prediction, data is compared with data from another location in the same frame.

For inter prediction, data from n–1 th frame $F_{n-1}$ 510 and data from the current frame $F_n$ 501 supply motion estimation block 511. Motion estimation block 511 determines the positions and motion vectors of moving objects within the picture. This motion data is supplied to motion compensation block 512 along with data from frame $F_{n-1}$ 510. The resulting motion compensated frame data is selected by switch 513 for application to subtraction unit 506. Subtraction unit 506 subtracts the inter prediction data from switch 513 from the input frame data from current frame $F_n$ 501. Thus frequency transform block 502, quantization block 503, reorder block 504 and entropy encoding block 505 encode the differential data rather than the original frame data. Assuming there is relatively little change from frame to frame, this differential data has a smaller magnitude than the raw frame data. Thus this can be expressed in fewer bits contributing to data compression. This is true even if motion estimation block 511 and motion compensation block 512 find no moving objects to code. If the current frame $F_n$ and the prior frame $F_{n-1}$ are identical, the subtraction unit 506 will produce a string of zeros for data. This data string can be encoded using few bits.

The second type of prediction is intra prediction. Intra prediction predicts a macroblock of the current frame from another macroblock of that frame. Inverse quantization block 520 receives the quantized data from quantization block 503 and substantially recovers the original frequency domain data. Inverse frequency transform block 521 transforms the frequency domain data from inverse quantization block 520 back to the spatial domain. This spatial domain data supplies one input of addition unit 522, whose function will be further described. Encoding process 500 includes choose intra predication unit 514 to determine whether to implement intra prediction. Choose intra prediction unit 514 receives data from current frame $F_n$ 501 and the output of addition unit 522. Choose intra prediction unit 514 signals intra prediction intra predication unit 515, which also receives the output of addition unit 522. Switch 513 selects the intra prediction output for application to the subtraction input of subtraction units 506 and an addition input of addition unit 522. Intra prediction is based upon the recovered data from inverse quantization block 520 and inverse frequency transform block 521 in order to better match the processing at decoding. If the encoding used the original frame, there might be drift between these processes resulting in growing errors.

Video encoders typically periodically transmit unpredicted frames. In such an event the predicted frame is all 0's. Subtraction unit 506 thus produces data corresponding to the current frame $F_n$ 501 data. Periodic unpredicted or I frames limits any drift between the transmitter coding and the receive decoding. In a video movie a scene change may produce such a large change between adjacent frames that differential coding provides little advantage. Video coding standards typically signal whether a frame is a predicted frame and the type of prediction in the transmitted data stream.

Encoding process 500 includes reconstruction of the frame based upon this recovered data. The output of addition unit 522 supplies deblock filter 523. Deblock filter 523 smoothes artifacts created by the block and macroblock nature of the encoding process. The result is reconstructed frame $F'_n$ 524. As shown schematically in FIG. 5, this reconstructed frame $F'_n$ 524 becomes the next reference frame $F_{n-1}$ 510.

Figure 6:
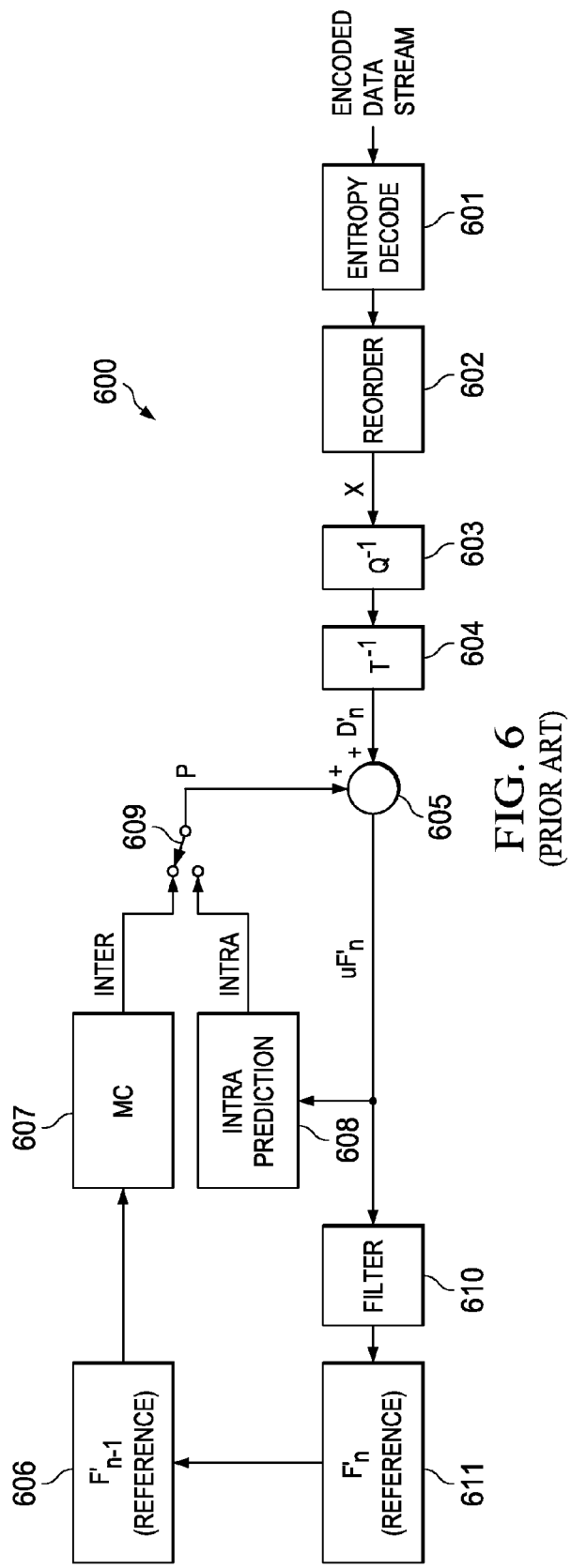
FIG. 6 illustrates an overview of the video decoding process of the prior art.

FIG. 6 illustrates the corresponding decoding process 600. Entropy decode unit 601 receives the encoded data stream. Entropy decode unit 601 recovers the symbols from the entropy encoding of entropy encoding unit 505. This invention is applicable to CABAC decoding. Reorder unit 602 assembles the macroblocks in raster scan order reversing the reordering of reorder unit 504. Inverse quantization block 603 receives the quantized data from reorder unit 602 and substantially recovers the original frequency domain data. Inverse frequency transform block 604 transforms the frequency domain data from inverse quantization block 603 back to the spatial domain. This spatial domain data supplies one input of addition unit 605. The other input of addition input 605 comes from switch 609. In inter mode switch 609 selects the output of motion compensation unit 607. Motion compensation unit 607 receives the reference frame $F'_{n-1}$ 606 and applies the motion compensation computed by motion compensation unit 512 and transmitted in the encoded data stream.

Switch 609 may also select intra prediction. The intra prediction is signaled in the encoded data stream. If this is selected, intra prediction unit 608 forms the predicted data from the output of adder 605 and then applies the intra prediction computed by intra prediction block 515 of the encoding process 500. Addition unit 605 recovers the predicted frame. As previously discussed in conjunction with encoding, it is possible to transmit an unpredicted or I frame. If the data stream signals that a received frame is an I frame, then the predicted frame supplied to addition unit 605 is all 0's.

The output of addition unit 605 supplies the input of deblock filter 610. Deblock filter 610 smoothes artifacts created by the block and macroblock nature of the encoding process. The result is reconstructed frame $F'_n$ 611. As shown schematically in FIG. 6, this reconstructed frame $F'_n$ 611 becomes the next reference frame $F_{n-1}$ 606.

The deblocking filtering of deblock filter 523 and deblock 610 must be the same. This enables the decoding process to accurately reflect the input frame $F_n$ 501 without error drift. The H.264 standard has a specific, very detailed decision matrix and corresponding filter operations for this process. The standard deblock filtering is applied to every macroblock in raster scan order. This deblock filtering smoothes artifacts created by the block and macroblock nature of the encoding. The filtered macroblock is used as the reference frame in predicted frames in both encoding and decoding. The encoding and decoding apply the identical processing the reconstructed frame to reduce the residual error after prediction.

Blocks 501, 502, 503, 504, 506, 506, 510, 51, 512, 513, 514, 515, 520, 521, 522, 523 and 524 of FIG. 5 and blocks 601, 602, 603, 604, 605, 606, 607, 608, 610 and 611 of FIG. 6 as well as other processes described below may be achieved via programmed operation of central processing unit 110 and/or via special purpose hardware included as part of peripherals 169 operating under the control of central processing unit 110. The selection of software or hardware to implement a particular function for any practical system is a design choice based upon the hardware budget of an integrated circuit performing the operations, the relative computation power of central processing unit 110 and other factors. Other relevant factors include the availability of previously written software modules or previously designed hardware modules.

A typical H.264 universal decoder implementation needs a high DDR footprint. This is primarily due to the large amount of memory needed for storing reference frames and co-located macroblock information required for decoding bidirectionally predicted (B) frame macroblocks. This is a big problem especially for High Definition (HD) decoding due to the large frame size.

A H.264 decoder typically requires multiple frames to be stored in a decoded picture buffer (DPB) as reference frames. The decoder may require up to N frames depending on the resolution. In addition many frames worth of macroblock information have to be stored in the dual data rate (DDR) memory. These are co-located macroblock information needed to decode B macroblocks. This macroblock information typically needs to store 208 bytes for each macroblock.

According to the H.264 standard, five current decoded frames are need as reference frames for HD of 1920 pixels by 1080 pixels. The amount of memory needed for padded reference buffers and co-located macroblock information buffers is $(4+1)*[((1920+64)*(1088+96)*1.5)+(8160*208)]$ or 24.9 Mbytes. Differing numbers of frame buffers is applicable for other pixel size resolutions. For example, for D1 resolution (720 pixels by 480 pixels) the maximum number of frame buffers is six. For CIF resolution (352 pixels by 288 pixels) the maximum number of frame buffers is 16.

This is a huge amount of memory. Many systems will not have this much free memory. This problem also becomes more severe in multichannel systems, where this large amount of memory needs to be allocated for each channel. This will demand a huge amount of DDR. Typical H264 decoder implementations need this memory regardless of the application or the type of streams/group of pictures (GOP) structures used.

This briefly describes how the DPB management is done in the prior art. The DPB management depends on whether the current decoded picture is a reference picture or a non-reference picture. The DPB management is defined by the H.264 standard.

When the current picture is a reference picture, it is stored in the DPB as follows. If there is an empty frame buffer available, the current decoded picture is stored in this frame buffer and the DPB fullness is incremented by one. If there is no empty frame buffer (a DPB fullness amount is equal to DPB size), a bumping process is invoked repeatedly until there is an empty frame buffer in which to store the current decoded picture. This bumping process is described below.

In addition for the reference frames, a sliding window process is used to make sure that the total of long term and short term reference frames is within a limit specified by the syntax element of the sequence parameter set. The syntax element num_ref_frames indicates the maximum size of a window of reference frames in the DPB. If the number of reference frames num_ref_frames is less than the maximum window-size, then the sliding-window marking process exits. The current decoded reference frame is added to the reference-frame window outside of this marking process. If the number of reference frames is equal to the maximum window size, then the oldest short-term reference frame is removed from the reference-frame window by changing its reference to UnusedForReference. This decrements the reference frame window size so that it may hold the current decoded reference frame which will be added to the DPB.

When the current picture is a non-reference picture, the following operations are performed. If there is an empty frame buffer (the DPB fullness amount is less than DPB size), the current decoded picture is stored in an empty frame buffer and the DPB fullness is incremented by one. If there is no empty frame buffer (the DPB fullness amount is equal to DPB size), the following operations are performed repeatedly until the current decoded picture has been cropped and output. If the current picture does not have a lower value of PicOrderCnt( ) than all pictures in the DPB marked as needed for output, the bumping process described below is performed. If the current picture has a lower value of PicOrderCnt( ) than all pictures in the DPB that are marked as needed for output, the current picture is cropped, using the cropping rectangle specified in the sequence parameter set for the sequence and the cropped picture is output.

The bumping process mentioned above attempts to free up a frame buffer in the DPB by displaying DPB frames in display order ascending Picture Order Count (POC) order until the frame that has just been displayed is a non-reference frame. This frame can be removed from the DPB because it is not needed for reference or display purposes. This frame removal frees a memory location in the DPB which can be used for storing the next frame.

In H.264, the display orders of pictures is generic and nearly independent of decode order. Display order is controller by POC. The DPB stores decoded pictures. The DPB size is function of level. For example, at 4.0 the maximum DPB size is 12,288 KBytes. The maximum number of frames stored in DPB is function of picture resolution. For level 4.0, the picture resolution varies from 4 to 16 frames. For example, for HD (1920×1080) this is 4 frames, for D1 (720×480) this is 6 frames and for QCIF this is 16 frames.

Thus N is function of resolution and can vary from 4 to 16. No picture is displayed before the first N−1 picture time slots. Thus for N=5, the first picture to display is decided only after 5 decode calls. The exact delay after which the decoder starts display depends on the stream properties. The displayDelay is the initial delay after which the decoder starts frame display. If the application has the knowledge of the initial delay, then it can configure the create time parameter displayDelay to specify the same.

Figure 7:
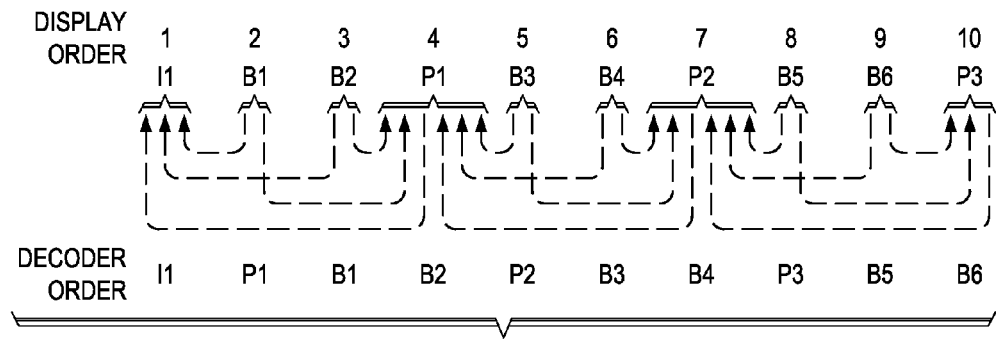
FIG. 7 illustrates the decoding information flow in as example group of pictures.

FIG. 7 illustrates an example GOP. In this example decoder order is I1-P1-B1-B2-P2-B3-B4-P3-B6-B7 and display order is I1-B1-B2-P1-B3-B4-P2-B5-B6-P3. FIG. 7 illustrates the decode dependencies between these ten frames. For example, decoding picture P1 depends upon picture I1 and decoding pictures B1 and B2 depend upon both pictures I1 and P1. With default DPB settings and a display delay including a default numRefFrames and a default display delay, the decoder DPB operation happens as described in Table 2.

TABLE 2

| | Frame number | | | | | | | | | |
|---|---|---|---|---|---|---|---|---|---|---|
| | 1 | 2 | 3 | 4 | 5 | 6 | 7 | 8 | 9 | 10 |
| Frame Type | I | P | B | B | P | B | B | P | B | B |
| POC | 1 | 4 | 2 | 3 | 7 | 5 | 6 | 10 | 8 | 9 |
| No. of Frames Locked by DPB | 1 | 2 | 3 | 4 | 5 | 5 | 5 | 5 | 5 | 5 |
| Display Frame Number | x | x | x | x | 1 | 3 | 4 | 2 | 6 | 7 |
| Free frame Number | x | x | x | x | x | 3 | 4 | 1 | 2 | 6 |

As shown in Table 2, the decoder DPB can lock up 5 picture buffers (5 buffers in the DPB). The decoder starts freeing up buffers after frame 5. Co-located macroblock information storage requires 5 frames worth of macroblock information storage space.

This invention differs from the previous art as follows: The decoder of this invention is implemented in a flexible manner such that: the decoder can operate with just P reference frames; and it can perform decoding with just P frames worth co-located macroblock information, where P<N. The decoder of this invention allows the application to configure the value of P, based on the use case.

This invention makes the memory use requirement configurable based on the actual application. The factors of this use include the stream properties and GOP size.

In many applications such as video conferencing or video surveillance, the GOP structure may be such that the decoder does not need to have N reference frames. In these cases, if the application is aware of the number of actual reference frames needed in terms of DPB Size, then the decoder can be configured to operate with just P reference frames, where P<N.

In these cases, the decoder will just lock P reference buffers and only than number of macroblock information buffers. This way the decoder can work with a much reduced DDR footprint by making the maximum number of reference frames num_ref_frames configurable.

Table 3 shows the attributes of this invention for the same GOP as illustrated in FIG. 7 and shown in Table 2. Using maxNumRefFrames=2 and displayDelay=2, the decoder of this invention needs to lock only 3 buffers. The decoder starts freeing up buffers after frame 3. Hence it will need 3 picture buffers and 3 co-located info buffers.

TABLE 3

| | Frame number | | | | | | | | | |
|---|---|---|---|---|---|---|---|---|---|---|
| | 1 | 2 | 3 | 4 | 5 | 6 | 7 | 8 | 9 | 10 |
| Frame Type | I | P | B | B | P | B | B | P | B | B |
| POC | 1 | 4 | 2 | 3 | 7 | 5 | 6 | 10 | 8 | 9 |
| No. of Frames Locked by DPB | 1 | 2 | 3 | 3 | 3 | 3 | 3 | 3 | 3 | 3 |
| Display Frame Number | x | x | 1 | 3 | 4 | 2 | 6 | 7 | 5 | 9 |
| Free frame Number | x | x | x | 3 | 4 | 1 | 2 | 6 | 7 | 5 |

The application can configure the number of reference frames needed for the streams via an input parameter. The decoder will request memory based on this parameter.

This also makes the decoder implementation especially the DPB management complex. The DPB and co-located macroblock information management now works on the maximum size given by the application and needs to ensure that the number of buffers needed does not exceed the given value.

Table 4 shows the savings when using this invention for the case of 1920×1080 HD resolution decoder.

TABLE 4

|  | Typical Decoder | Invention Decoder P = 1 | | Invention Decoder P = 2 | |
| --- | --- | --- | --- | --- | --- |
|  | Size MBytes | Size MBytes | Savings | Size MBytes | Savings |
| Padder Ref Frame | 16.8 | 6.72 | 60% | 10.08 | 40% |
| Co-located Macroblock information buffer | 8.1 | 3.24 |  | 4.86 |  |
| Total | 24.9 | 9.96 |  | 14.94 |  |

In Table 4 a GOP example for the invention decoder with P=1 is I-P-P-P-P-P. In Table 4 a GOP example for the invention decoder with P=2 is I-B-B-P-B-B-P-B-B-P.

A typical H.264 decoder requires a huge amount memory irrespective of the GOP structure used. This invention gives the control to the application setting the number of reference frames. Thus this invention can optimally select the amount of the memory reused dependent upon the GOP. The application can configure the maxNumrefFrames parameter based on the knowledge it has on the GOP structure, stream properties etc. For a given maxNumrefFrames value, the decoder performs buffer management so that it does not lock up more than maxNumrefFrames+1 buffers. This provides a significant reduction of the memory (DDR) foot print. For example, for the best case of maxNumrefFrames=1, this invention reduces the memory footprint by 60%.

Figure 8:
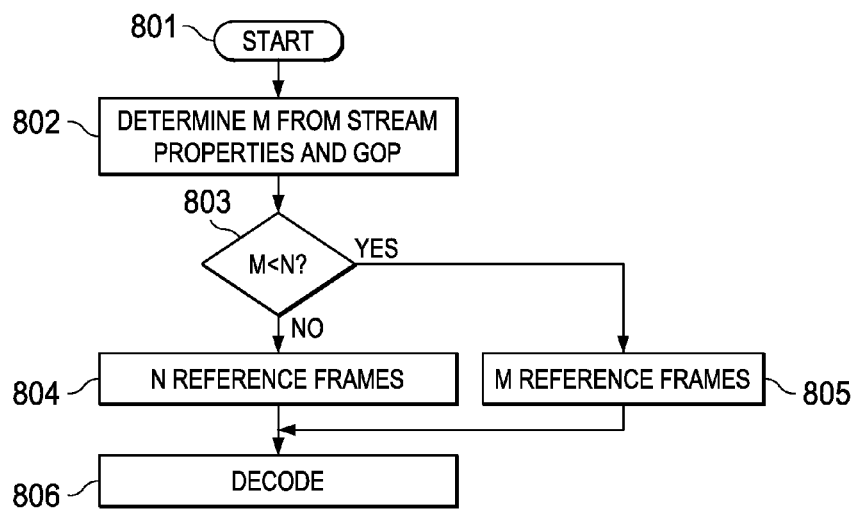
FIG. 8 is a flow chart illustrating the method of this invention.

FIG. 8 illustrates operation of this invention. The processor of FIG. 8 is preferably invoked for every GOP in the video. The process begins with start block 801. Block 802 reviews the steam properties of the current GOP. This includes the frame type (I, P, B). The H.264 standard provides a sequence level parameter num_ref_frames as part of Sequence parameter set (SPS). Block 802 may parse the stream header and get this parameter. Applications such as video conferencing typically employ a simple GOP structure such as IPPPP. These two parameters together enable determination of the maxNumrefFrames parameter. For example if num_ref_frames from SPS is 1 and the GOP structure is IPPPP, then with an increasing POC (encoder characteristic) set maxNumRefFrames to 1 which will lock only 1 frame. If the GOP structure is IBPBPBP with B picture displayed after the succeeding P picture, then set maxNumRefFrames to 2. The result of this parsing is a number for maxNumRefFrames M.

Test block 803 determines whether the review of block 802 indicates a requirement of M reference frames for the current GOP is less than N reference frames. N is the maximum number of reference frames needed for the pixel resolution of the video data. If not (No at test block 803), then block 804 sets the memory to require N reference frames. If true (Yes at test block 803), then block 805 sets the memory to require M blocks determined in block 802, where M<N. In either case block 806 decodes the current GOP with the thus configured memory.

What is claimed is:

1. A computer implemented method of compressed video decoding comprising the steps of:
for each group of pictures determining a number of reference frames M needed for decoding including considering stream properties of the group of pictures and frame types of pictures of the group of pictures from among the frame types including non-predicted frames (I), predicted frames (P) and bidirectionally predicted frames (B);
if M is less than N, where N is the maximum number of reference frames needed for decoding video any group of pictures of the current pixel resolution, configuring a memory for M reference frames;
if M is not less than N, configuring a memory for N reference frames; and
allocating an amount of memory to store the configured number of reference frames;
decoding the group of pictures using the configured number of reference frames.

2. The computer implemented method of claim 1, wherein:
the maximum number of reference frames needed for decoding video of the current pixel resolution N for HD frames of 1920 pixels by 1080 pixels resolution is 5.

3. The computer implemented method of claim 1, wherein:
the maximum number of reference frames needed for decoding video of the current pixel resolution N for D1 frames of 720 pixels by 480 pixels resolution is 6.

4. The computer implemented method of claim 1, wherein:
the maximum number of reference frames needed for decoding video of the current pixel resolution N for CIF frames of 352 pixels by 288 pixels resolution is 16.

5. The computer implemented method of claim 1, wherein:
said step of determining a number of reference frames M needed for decoding determines a single reference frame is needed to decode a group of frames having sequential frame types I, P, P, P, P.

6. The computer implemented method of claim 1, wherein:
said step of determining a number of reference frames M needed for decoding determines two reference frames are needed to decode a group of frames having sequential frame types I, B, P, B, P, B, P.

* * * * *